(12) United States Patent
Kinoshita et al.

(10) Patent No.: US 9,230,591 B2
(45) Date of Patent: Jan. 5, 2016

(54) OPTICAL DISC LIBRARY AND STORAGE APPARATUS INCLUDING DISC CHANGER FUNCTIONALITY

(71) Applicant: Hitachi-LG Data Storage, Inc., Tokyo (JP)

(72) Inventors: Yasushi Kinoshita, Tokyo (JP); Hiroshi Yamagishi, Tokyo (JP); Yoshihiro Fukagawa, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 14/242,903

(22) Filed: Apr. 2, 2014

(65) Prior Publication Data

US 2014/0301813 A1 Oct. 9, 2014

(30) Foreign Application Priority Data

Apr. 5, 2013 (JP) ................................ 2013-079092

(51) Int. Cl.
*G11B 17/22* (2006.01)
*G11B 17/28* (2006.01)

(52) U.S. Cl.
CPC .............. *G11B 17/225* (2013.01); *G11B 17/22* (2013.01); *G11B 17/28* (2013.01)

(58) Field of Classification Search
CPC ....... G11B 17/225; G11B 17/28; G11B 17/22
USPC .......... 369/30.51, 30.52, 30.85, 30.76, 30.77, 369/30.61, 30.49; 720/615
See application file for complete search history.

(56) References Cited

U.S. PATENT DOCUMENTS

| | | | | |
|---|---|---|---|---|
| 4,567,584 A * | 1/1986 | Kawakami | ................. | 369/30.85 |
| 4,580,254 A * | 4/1986 | Hojyo et al. | ................ | 369/30.29 |
| 4,589,101 A * | 5/1986 | Schatteman et al. | .......... | 369/30.7 |
| 4,599,716 A * | 7/1986 | Shimbo | ....................... | 369/30.59 |
| 4,633,452 A * | 12/1986 | Shimbo et al. | .............. | 369/30.83 |
| 4,695,990 A * | 9/1987 | Kawakami | ................. | 369/30.85 |
| 5,067,116 A * | 11/1991 | Kadrmas | .................... | 369/30.86 |
| 5,107,475 A * | 4/1992 | Serita et al. | ................ | 369/30.85 |
| 5,136,562 A * | 8/1992 | Staar | ........................... | 369/30.53 |
| 5,274,620 A * | 12/1993 | Sipos | .......................... | 369/30.85 |
| 5,289,441 A * | 2/1994 | Domberg et al. | .......... | 369/30.31 |
| 5,335,218 A * | 8/1994 | Osada | ........................ | 369/30.85 |
| 5,544,148 A * | 8/1996 | Nakamichi | ................ | 369/30.82 |
| 5,550,801 A * | 8/1996 | Enomoto et al. | ........... | 369/30.77 |
| 5,586,094 A * | 12/1996 | Pines et al. | ................. | 369/30.85 |
| 5,715,230 A * | 2/1998 | Choi | .......................... | 369/30.61 |
| 5,754,519 A * | 5/1998 | Bando | ........................ | 369/30.89 |
| 5,881,045 A * | 3/1999 | Inoue | ............................ | 720/621 |
| 5,923,638 A * | 7/1999 | Watanabe | ..................... | 720/668 |
| 5,943,306 A * | 8/1999 | Silverstein | ................. | 369/30.86 |
| 5,953,293 A * | 9/1999 | Kajiyama et al. | .......... | 369/30.86 |
| 5,959,958 A * | 9/1999 | Inatani et al. | .............. | 369/30.85 |
| 6,002,662 A * | 12/1999 | Watanabe et al. | .......... | 369/30.85 |

(Continued)

FOREIGN PATENT DOCUMENTS

JP 9-82006 A 3/1997

*Primary Examiner* — Brian Miller
(74) *Attorney, Agent, or Firm* — Baker Botts L.L.P.

(57) ABSTRACT

In an optical disc library apparatus having a cartridge storing discs; a drive carrying out recording and playback with respect to the discs; and a robot carrying out disc movements between the aforementioned cartridge and the aforementioned drive; wherein: the periphery of a disc is point restrained in three places during disc movement.

3 Claims, 6 Drawing Sheets

(56) References Cited

U.S. PATENT DOCUMENTS

| | | | |
|---|---|---|---|
| 6,164,899 A * | 12/2000 | Burg et al. | 414/758 |
| 6,178,153 B1 * | 1/2001 | Cho et al. | 369/30.85 |
| 6,212,139 B1 * | 4/2001 | Nakamura et al. | 369/30.85 |
| 6,590,842 B1 * | 7/2003 | Kajiyama et al. | 369/30.86 |
| 7,596,059 B2 * | 9/2009 | Koseki | 369/30.85 |
| 7,817,504 B2 * | 10/2010 | Tsukaguchi | 369/30.77 |
| 7,826,313 B2 * | 11/2010 | Ichikawa et al. | 369/30.78 |
| 2004/0017741 A1 * | 1/2004 | Tatehata et al. | 369/30.85 |
| 2012/0117578 A1 * | 5/2012 | Goyal et al. | 720/615 |
| 2014/0301813 A1 * | 10/2014 | Kinoshita et al. | 414/281 |

* cited by examiner

OPTICAL DISC LIBRARY AND STORAGE APPARATUS INCLUDING DISC CHANGER FUNCTIONALITY

BACKGROUND OF THE INVENTION

The present invention is concerned with an optical disc library apparatus provided with a function of automatically swapping a plurality of optical discs.

In JP-A-H09-82006, there is reported the configuration of an optical disc library device storing a plurality of discs vertically in a disc cartridge. In this disc cartridge, an arcuately curve shaped recessed portion and V-shaped grooves are formed at least at both ends in the curved direction of the recessed portion.

Due to the fact that a disc is supported nearly vertically by means of the arcuately shaped recessed portions and the V-shaped grooves, problems such as the disc making contact with a corner part on the opening side of the disc storage part and the disc getting scratched from chafing against the disc stored adjacently are prevented.

However, if the disc spacing is narrowed in order to increase the capacity of the disc cartridge, with the near verticality of a disc implemented with the aforementioned configuration, there is the possibility that, on the occasion of storing the disc in the disc cartridge, there arise transport problems such as the neighboring disc, since it is tilted and pushed out, ending up getting caught and becoming scratched by chafing.

Also, if, for the purpose of disc transport, a disc inside the disc cartridge is moved slightly from the disc holding position, the posture of the disc becomes very unstable, since one of the V-shaped grooves on the two ends of the recessed portion supporting the disc moves away.

Because of this, due to the fact that the disc performs actions like colliding with the neighboring disc or a constituent part of the transport part periphery and getting caught and chafed, there are cases where there arise problems such as the disc getting scratched. In the case where a transport problem such as this occurs, the result is that the device is halted for repair purposes and that the performance of the device is notably diminished.

SUMMARY OF THE INVENTION

Accordingly, the present invention has for an object to prevent transport problems such as the disc colliding with a neighboring disc or a constituent part on the transport path periphery so that regular transport becomes impossible to carry out or the disc getting scratched due to chafing, due to the fact that a disc during movement is greatly inclined in the out-of-plane direction, and to furnish an optical disc library apparatus with few disc transport problems and high reliability.

In order to solve the aforementioned problem, the present invention has adopted a configuration in which, when the disc is at rest, the perimeter of the disc is point restrained in two places. Also, during movement of the disc, there was taken a configuration in which the disc periphery is point restrained in three places. In this way, there was adopted a construction in which the posture of the disc is compensated by normally point restraining the disc perimeter in a plurality of places.

Specifically, inside a disc cartridge, a rack retaining the upper end of a disc and a rack retaining the lower end of the disc have been provided, arcuately curve shaped spaces in the respective racks have been formed and an inclination has been provided inside a guiding groove including the same spaces. Moreover, an inclination has also been provided inside a guiding groove of a mechanism (kicker) pushing out the disc. Further, there has also been provided a slope inside the guiding groove of a rail constituting a disc storage part of disc movement mechanism (robot).

According to the present invention, tilt is restrained when the disc is at rest and when the disc is moving, so a grip of the disc based on a disc movement mechanism can be carried out with certainty. Also, it is possible to prevent the disc from colliding with constituent material on the transport path periphery and to avoid disc transport problems.

In this way, a reduction in disc transport problems becomes possible and an optical disc library apparatus with high reliability can be furnished.

DESCRIPTION OF THE EMBODIMENT

Hereinafter, there will be given a description regarding the embodiment.

Embodiment 1

Figure 1:
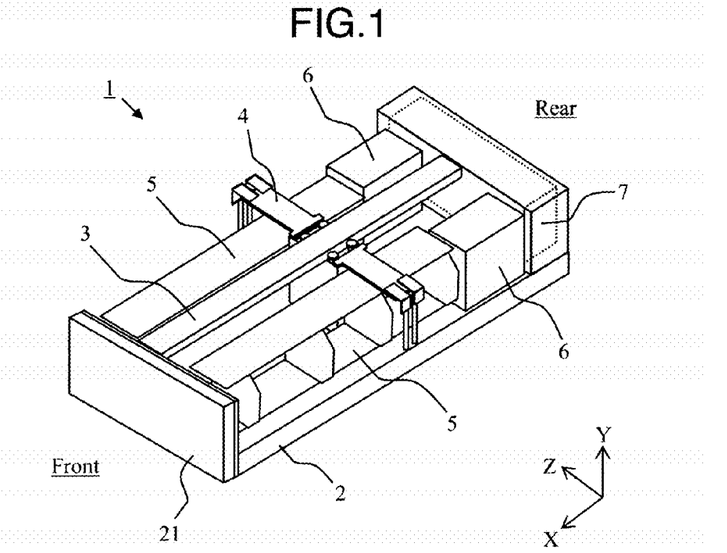
FIG. 1 is an example of a structural drawing of an optical disc library apparatus.

In the present embodiment, there will be described an example of an optical disc library apparatus related to the present invention. FIG. 1 is an example of a structural drawing of an optical disc library apparatus of the present embodiment. An optical disc library apparatus 1 has a chassis 2, a guide rail 3, a robot 4, a cartridge 5, a drive 6, and a controller 7.

Chassis 2 is a box-type receptacle storing constituent parts of optical disc library apparatus 1. Chassis 2 is U-shaped and has a front side, a bottom face side, and a rear side and is designed so that high rigidity is obtained. In chassis 2, there are mounted: a top cover, covering both side faces and the top face, which is not illustrated in order to show the interior configuration; and a front door 21 on the front side.

Guide rail 3 is a bridge-shaped component that is designed to be built across the top side center of the front side wall face of chassis 2 and the top center of the rear side wall face. On the faces of both sides of the bridge-shaped component, there is provided a single-edged rail having a V-type cross section shape. Also, on the inner side of the bridge-shaped component, there is provided a lead screw for moving robot 4.

Robot 4 has four wheels engaging the single-edged rail of aforementioned guide rail 3; a box-type disc storage part storing a disc; a mechanism (picker) situated inside the disc storage part and carrying out the putting in and taking out of the disc and the retention thereof; and a mechanism (kicker) moving a rod-shaped arm provided on the tips of the faces on both sides and pushing out the disc in the disc storage part direction. Robot 4 is suspended on the guide rail with the wheels and can move freely along guide rail 3 from the front side to the rear side. The drive power needed for the movement of robot 4 is obtained from the lead screw provided in guide rail 3.

Cartridge 5 has, as shown in detail hereinafter, a frame formed in sheet material, a rack storing a plurality of discs vertically with a fixed spacing, and a spring for retaining the discs so that discs inside the rack fall out. As for cartridges 5, it is possible to dispose two thereof, on both sides of guide rail 3, sandwiching the same. Also, a cartridge 5 can be extracted to the outside of optical disc library apparatus 1 through front door 21 provided on the front side of chassis 2. By making the same extractible in this way, it comes to be that a plurality of cartridges 5 can be operated with respect to one apparatus 1.

A drive 6 is constituted by a plurality of slot-type optical disc devices. The optical disc devices are installed vertically with a fixed spacing. As for drives 6, two thereof are disposed, on both sides of guide rail 3, sandwiching the same. Drives 6 are disposed side by side with cartridges 5.

Controller 7 is composed of a microcomputer, a communication board, and a cooling device such as a fan. Controller 7 carries out control of mechanical systems such as robot 4 and driver 6 and communication with the exterior, such as operating instruction and status transmission and reception as well as data transmission and reception.

Figure 2:
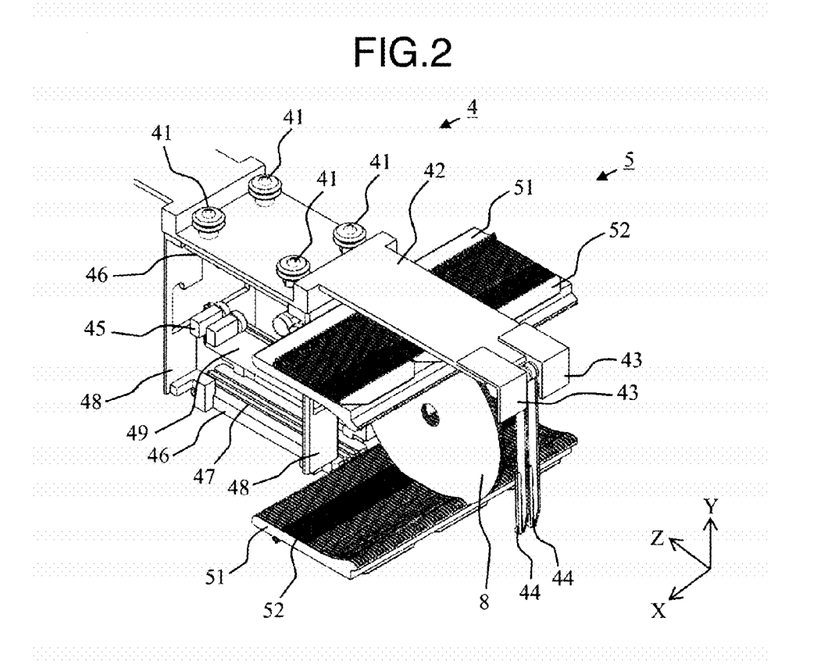
FIG. 2 is an example of the detailed construction of a robot periphery.

Hereinafter, there will be given a description regarding the detailed construction of the periphery of robot 4 of the present embodiment. FIG. 2 is an example of the detailed construction of the periphery of robot 4 of the present embodiment. Robot 4 has wheels 41, a sled 42, brackets 43, kickers 44, pickers 45, rails 46, springs 47, a frame 48, and a guide 49. Also, cartridge 5 has racks 51 and springs 52. In cartridge 5, discs 8 are stored.

Wheel 41 is one having a V-shaped groove formed in the perimeter of the bearing. In this V-shaped groove, the single-edged rail of guide rail 3 is engaged (refer to FIG. 1). By adjusting the relative positions of the four wheels 41 provided in robot 4, the system is devised so that guide rail 3 is firmly inserted in between, without there arising any play during the movement of robot 4.

Sled 42 is a plate having an arm stretched out over the whole width of optical disc library apparatus 1. In sled 42, there is mounted a disc storage part including four wheels 41, kickers 44 on both ends of the arm, and a picker 45 in the lower part.

Brackets 43 are L-type components joining sled 42 and kickers 44. The brackets are provided for the fixing and protection of kickers 44.

Kickers 44 are composed of a thin rod-shaped arm, a guide at the tip of the arm, and a drive motor to swing the arm. In the guide of the tip of the arm, there is formed a groove and by fitting disc 8 into this groove, it comes to be that disc 8 does not get disconnected. As for kickers 44, two thereof are provided on one arm of sled 42.

Picker 45 is composed of two solenoids and a not illustrated drive means moving this pair of solenoids in the z direction. In each of the respective solenoids, there is provided a cylinder-shaped protrusion capable, by means of the solenoid, of performing operations like thrusting out and retracting in the x direction. To fit into a center hole with a diameter of 15 mm that is made in the center of disc 8, the cylinder-shaped protrusion is made with an outer diameter that is a little smaller than the center hole. As for pickers 45, two pairs thereof are provided in robot 4. By making a configuration in this way, it is possible to simultaneously transport two discs 8.

A rail 46 is a plate having formed therein a guiding groove guiding disc 8. Inside the guiding groove of rail 46, there are made through holes leading to the back face from the groove face in several places. As for rails 46, one is provided in the bottom face of robot 4 and another one is provided on the bottom face of sled 42. This pair of rails 46 is installed so that the respective guiding grooves are facing each other.

"Spring 47 is a plate spring. Spring 47 is mounted on the back face of rail 46, such that the face of spring 47 pushes out from the through hole made in rail 46 to the side of disc 8."

Frame 48 is a plate connecting the top and bottom rails 46 with sled 42. The disc storage part of robot 4 is composed of frame 48 and a pair of rails 46.

Guide 49 is a flat plate provided in a position at about half the height of disc 8. During transport of disc 8, due to the fact that the perimeter of disc 8 makes contact with guide 49, it comes to be that oscillation of disc 8 is restricted.

Rack 51 is a plate-shaped component in which a plurality of grooves are formed with a fixed spacing on one side. Inside the guiding groove of rack 51, there is made a through hole leading from the groove face to the back face. In cartridge 5, racks 51 are installed in pairs. At this point, paired racks 51 have grooves formed therein whose faces mutually face each other.

Spring 52 is a comb tooth shaped flat spring. Spring 52 is mounted on the back face of rack 51. At this point, it comes about that the face of spring 52 pushes out from the through hole made in rack 51 to the disc 8 side.

"In optical disc library apparatus 1 of the present embodiment, robot 4 carries out disc release, transport, and stacking operations. Robot 4 releases transporting disc 8 from cartridge 5 to drive 6 and stacks transporting disc 8 from drive 6 to cartridge 5 (refer to FIG. 1). Regarding the aforementioned stacking and release sequences, a description will be given using a flowchart."

Figure 3:
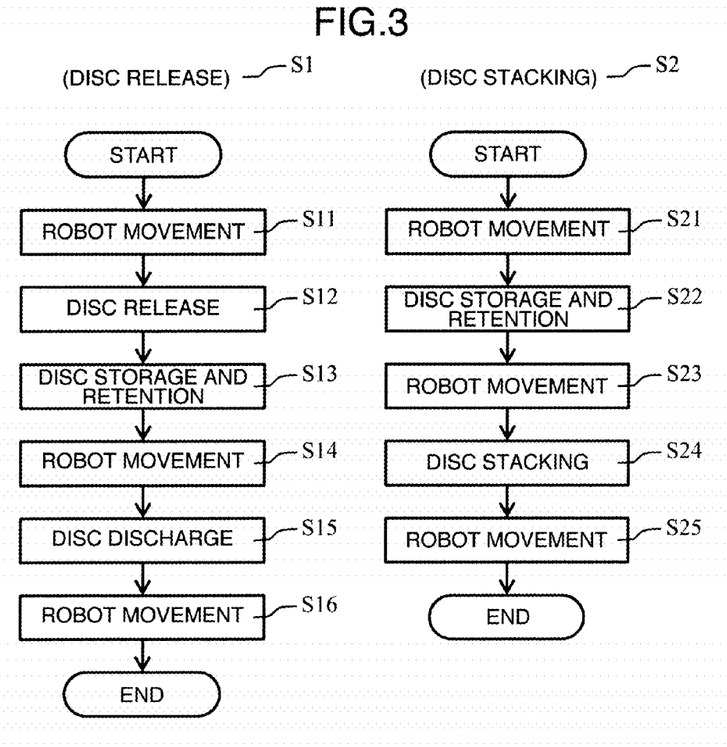
FIG. 3 is an example of a flowchart describing disc transport processing.

FIG. 3 is an example of a flowchart describing the processing of disc transport. Disc release sequence S1 consists of a robot movement S11, a disc release S12, disc storage and retention S13, a robot movement S14, a disc discharge S15, and a robot movement S16.

Robot movement S11 is a process that moves robot 4 from a standby position to one in front of a designated disc 8 stored in cartridge 5. Robot 4 moves by means of the rotation of a lead screw provided in guide rail 3. At this point, the speed of movement is controlled by means of trapezoidal drive (acceleration, fixed speed, deceleration), a contraction in the time of movement being aimed for. Robot 4 halts its movement in front of designated disc 8. In order to make the positioning of robot 4 be carried out with precision, an encoder slit provided on the cartridge 5 side is detected by means of a sensor provided on the robot 4 side and positioning control is carried out.

Disc release S12 is a process that pushes out designated disc 8 stored in cartridge 5 to the exterior of cartridge 5. Kickers 44 provided in robot 4 are driven and an arm is made to swing in the direction of the disc storage part of robot 4. At this point, the perimeter of designated disc 8 is pushed with the guide at the tip of the arm and designated disc 8 is pushed out to the exterior of cartridge 5. The pushing out of disc 8 is carried out until the center hole of disc 8 has reached the disc storage part of robot 4 and thereafter, the swing of the arm is halted.

Disc storage and retention S13 is a process that stores disc 8 in the disc storage part of robot 4 and retains the same. First, picker 45 provided in the disc storage part of robot 4 is moved to the movable end on the side at which disc 8 is inserted. And then, the cylinder-shaped protrusion of picker 45 is inserted in the disc 8 center hole that is halted in a state of being about to enter the disc storage part of robot 4. In this way, disc 8 is gripped by the cylinder-shaped protrusion of picker 45. Next, picker 45 is moved, disc 8 is retracted into the center of the disc storage part, and disc 8 is retained there. Kickers 44 are returned to the pre-swing position.

Robot movement S14 is a process that moves robot 4 to a place in front of a designated drive 6. In order to make robot 4 and designated drive 6 be accurately aligned, there is, similarly to cartridge 5, provided an encoder slit on the driver 6 side as well. This is detected by means of a sensor provided on the robot 4 side and positioning control is carried out.

Disc release S15 is a process that discharges disc 8 from the disc storage part of robot 4 and makes disc 8 retract into designated drive 6. First, picker 45 provided inside the disc storage part of robot 4 is made to move up to the movable end on the side of designated drive 6. By means of this operation, about half of disc 8 is discharged from the disc storage part inside robot 4.

And then, picker 45 extracts the cylinder-shaped protrusion from the center hole of disc 8 by means of the solenoids and releases disc 8. Next, picker 45 moves to the center of the disc storage part and, by means of the solenoids, thrusts out the cylinder-shaped protrusion to a place farther out than the perimeter of disc 8. Once again, picker 45 is moved in the direction of designated drive 6. By means of this operation, disc 8 has its perimeter pushed by the cylinder-shaped protrusion and is completely discharged from the disc storage part of robot 4. After the discharge of disc 8, picker 45 inside robot 4 returns to the center of the disc storage part of robot 4. During the aforementioned string of operations, designated drive 6 introduces disc 8 by means of a slot mechanism inside drive 6 and proceeds to disc 8 recording and playback operation.

Robot movement S16 is a process that moves robot 4 to a standby position. Disc stacking sequence S2 consists of robot movement S21, disc storage and retention S22, robot movement S23, disc stacking S24, and robot movement S25.

Robot movement S21 is a process that moves robot 4 from a standby position to a place in front of designated drive 6.

Disc storage and retention S22 is a process that stores disc 8 in the disc storage part of robot 4 and retains the same. By means of the slot mechanism of designated drive 6, disc 8 is discharged to the exterior of drive 6. By this operation, disc 8 is pushed into the disc storage part of robot 4. Picker 45 provided inside the disc storage part of robot 4 is moved to the movable end of the side which disc 8 is inserted. And then, the cylinder-shaped protrusion of picker 45 is inserted in the disc 8 center hole that is halted in a state of being about to enter the disc storage part of robot 4. In this way, disc 8 is gripped by the cylinder-shaped protrusion of picker 45. Next, picker 45 is moved, disc 8 is retracted into the center of the disc storage part, and disc 8 is retained there.

Robot movement S23 is a process that moves robot 4 from a place in front of designated drive 6 to a place in front of the disc stacking position of cartridge 5.

Disc stacking S24 is a process that discharges disc 8 from the disc storage of robot 4 and stores disc 8 in a stacking position of cartridge 5. First, picker 45 provided inside robot 4 is moved up to the movable end on the stacking position side of cartridge 5. By this operation, about half of disc 8 is discharged from the disc storage part of robot 4. And then, picker 45 extracts the cylinder-shaped protrusion from the center hole of disc 8 by means of the solenoids and releases disc 8. Next, picker 45 moves to the center of the disc storage part and, by means of the solenoids, thrusts out the cylinder-shaped protrusion to a place farther out than the perimeter of disc 8. Once again, picker 45 is moved in the direction of the stacking position of cartridge 5. By this operation, disc 8 has its perimeter pushed by the cylinder-shaped protrusion and is completely discharged from the disc storage part of robot 4. After the discharge of disc 8, picker 45 inside robot 4 returns to the center of the disc storage part of robot 4. By the aforementioned string of operations, disc 8 is stored in the stacking position of cartridge 5. At this point, disc 8 is retained by means of the grooves of racks 51 that are provided at the top and bottom of cartridge 5 and springs 52 mounted in racks 51.

Robot movement S25 is a process that moves robot 4 to a standby position.

Figure 4:
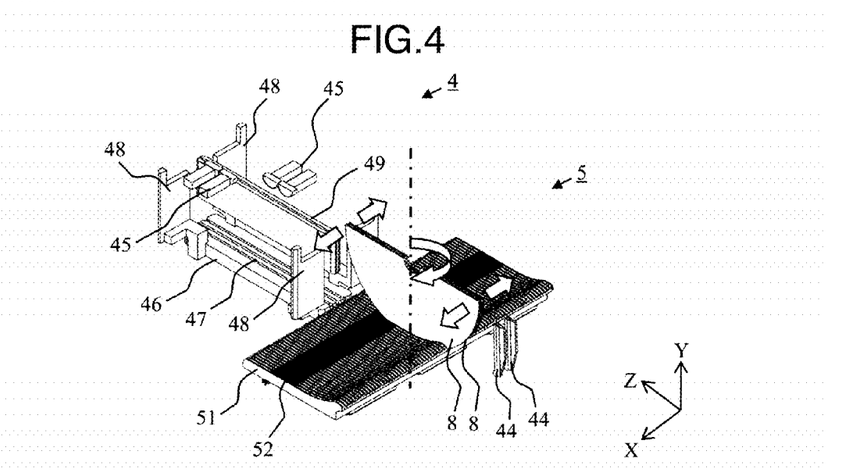
FIG. 4 is an example of a horizontal cross section of the detailed construction of a robot periphery.

Regarding the problem to be solved by the present invention, there will be given a description using a horizontal cross section drawing of the detailed construction of the periphery of robot 4 of the present embodiment. FIG. 4 is an example of a horizontal cross section of the detailed construction of a robot periphery. The configurations of robot 4 and cartridge 5 are the same as in FIG. 2.

In the aforementioned disc stacking and release sequences S1 and S2, disc 8 is moved by means of kickers 44 and a picker 45 in S2. At this point, disc 8 is guided by a pair of racks installed at the top and bottom of cartridge 5 and a pair of rails 46 constituting the disc storage part of robot 4.

The width of the guiding grooves formed in aforementioned racks 51 and rails 46 is formed to be slightly greater than the maximum thickness of disc 8. Because of this, there exists some play between the guiding grooves and disc 8. Due to this play, disc 8 performs actions like slipping and tilting inside the guiding grooves. In the horizontal cross section (FIG. 4) passing through the center of disc 8, disc 8 gives rise to slippage and tilting and in this way, there arises great misalignment of the position of the perimeter of disc 8 in the direction away from the disc.

Due to the fact that disc 8 stored in cartridge 5 gives rise to misalignment and tilting, kickers 44 pushing out the perimeter of disc 8 perform actions such as hitting and missing, so there are cases when there are flaws in the transport of disc 8. Also, due to the fact that disc 8 moves while performing actions like slipping and tilting, there are cases where transport faults arise, such as colliding with structures of the transport path periphery (frame 48, picker 45, neighboring discs 8, and other items), getting caught, and getting damaged. As for these transport faults, since there is a large play in the case where the thickness of disc 8 is small, the probability thereof increases.

In this way, due to the slippage and tilting of disc 8, there are cases where transport faults arise, so there has been the possibility that the reliability of optical disc library apparatus 1 is impaired.

Figure 5:
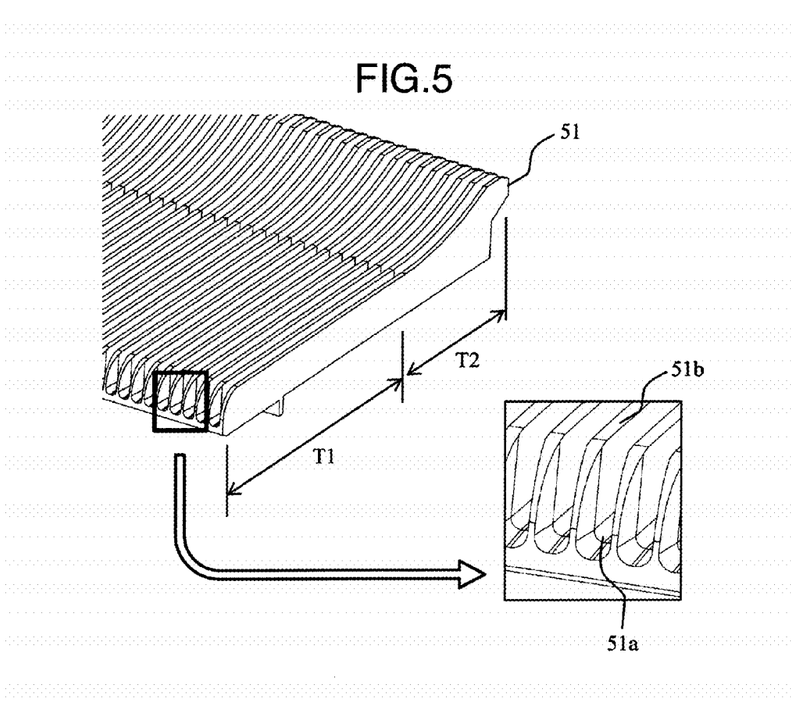
FIG. 5 is an example of a partially expanded view of a rack.

Accordingly, in the present embodiment, there is provided a slope in the disc contact surfaces, making contact with disc 8, of kickers 44, racks 51, rails 46, and picker 45 and by means of this slope, the position of the perimeter of disc 8 is point restrained in several places. In this way, the slippage and tilting of disc 8 is reduced, so it comes to be that it is possible to obtain an optical disc library apparatus 1 with high reliability. There will be given a description regarding of a means reducing the slippage and tilting of disc 8 stored and retained in cartridge 5. FIG. 5 is an example of a partially expanded view of a rack 51.

A rack 51 has a guiding groove 51a guiding a disc and a partition wall 51b for the partition with adjacent guiding groove 51a. In guiding groove 51a and partition wall 51b of a rack 51, there are provided a flat segment T1 and a segment T2 formed as a curved surface to match the curvature of the disc periphery. Flat segment T1 is formed on the disc storage part side of robot 4 and segment T2 having a curved surface is formed on the side of kickers 44. Disc 8 is stored and retained in cartridge 5 in a state where the periphery of the disc makes contact with the curved surface of segment T2.

As for rack 51, the shape of guiding groove 51a is formed in a U shape as regards flat segment T1 and segment T2 having a curvature. If the shape of guiding groove 51a is chosen to be a U shape, it is possible to get a rounded-R based inclination in the vicinity of the bottom face of guiding groove 51a. By means of this inclination, disc 8 in contact slides down deeper than guiding groove 51a, along the inclination. Since disc 8 makes contact with guiding groove 51a on the front side and the back side, the position of disc 8 inside guiding groove 51a is determined by competition of the sliding-down forces of both sides. The U-formed shape works out to being symmetric on the left and right with respect to the center line. Because of this, the result is that disc 8 is made to approach the center of guiding groove 51a.

In this way, by providing an inclination inside guiding groove 51a of rack 51, it is possible to perform actions like making the position of disc 8 approach the center of guiding groove 51a or making it approach one side thereof. E.g., if the shape of guiding groove 51a is chosen to be a V shape, it is possible, similarly to a U shape, to make the position of disc 8 approach the center of guiding groove 51a. Also, if the shape of guiding groove 51a is chosen to be an inclination plane with a fixed inclination angle, it is possible to make the position of disc 8 approach one side of guiding groove 51a.

Figure 6:
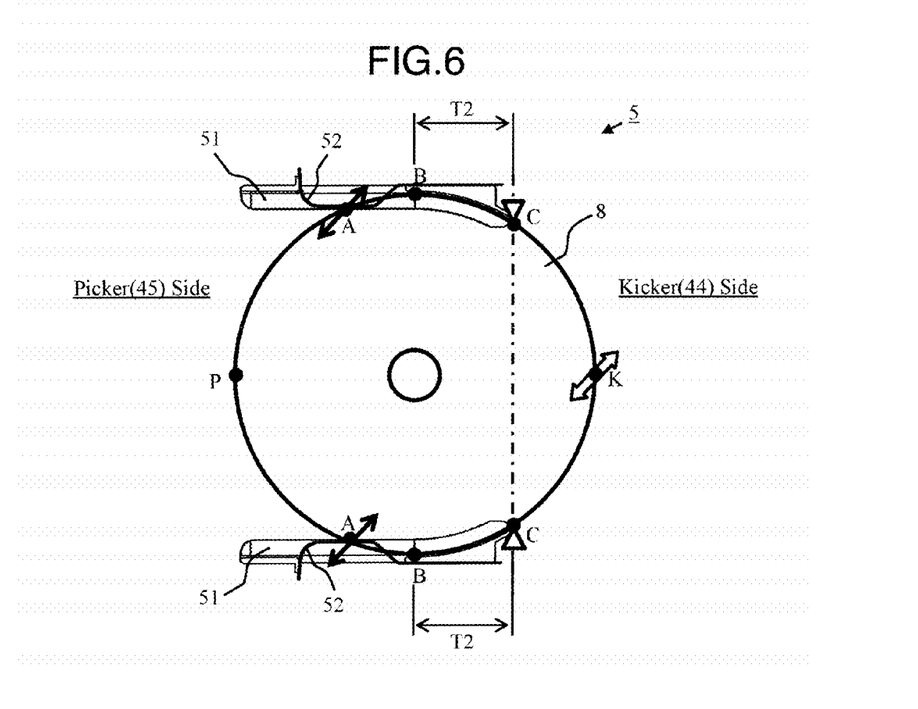
FIG. 6 is an example of a vertical cross section of a cartridge at the time of disc storage.

FIG. 6 is an example of a vertical cross section of a cartridge 5 during storage of the disc. Cartridge 5 has a construction in which the aforementioned racks 51 are paired and the guiding groove side faces of racks 51 are opposed to provide a disc 8 storage part. A disc 8 stored in cartridge 5 is retained in segment T2 having the curved surfaces of top and bottom racks 51. Also, in order that disc 8 does not fall out from cartridge 5, the periphery of disc 8 is pushed in the direction of kickers 44 by means of springs 52 provided inside guiding grooves 51a of racks 51.

Points A are the points of contact between the periphery of disc 8 and partition walls 51b of racks 51 and are contact points situated on the picker 45 side of robot 4. Points B are points of contact between the periphery of disc 8 and guiding grooves 51a of racks 51. Points C are points of contact between the periphery of disc 8 and partition walls 51b of racks 51 and are contact points situated on the kicker 44 side of robot 4. Point P is a peripheral point on the top-to-bottom symmetry line of disc 8 and is a contact point situated on the picker 45 side of robot 4. Point K is a peripheral point on the top-to-bottom symmetry line of disc 8 and is a contact point situated on the kicker 44 side of robot 4. Kickers 44 make contact at this K point to push out disc 8 to the exterior of cartridge 5. The arrows of points A express the positional misalignment in a direction away from the disc at points A. Also, the triangle marks at points C express the fact that points C are restrained (do not move).

In the present embodiment, guiding grooves 51a of racks 51 are taken to have a U shape. At points C of the top and bottom racks, disc 8 is made to approach the center of guiding grooves 51a, being point restrained at two points. In this way, disc 8 has its slippage and tilting restricted only to an inclination in a direction away from the disc plane having as its axis of rotation a line joining the two points C. Further, as for the inclination of disc 8 away from its face, the periphery of the disc is restricted at points A by partition walls 52. In a disc retention state such as this, as for disc periphery point K that kickers 44 must grip, the shorter the distance up to the axis of rotation joined by both points C, the smaller is the positional misalignment in the direction away from the plane of the disc. In the present embodiment, by providing a segment T2 in racks 51, the distance between point K and the axis of rotation joined by both points C has been made short and the positional misalignment in a direction away from the plane of the disc has been reduced.

In this way, by forming guiding grooves 51a into U shapes together with forming curved surfaces adapted to the curvature of disc 8 in disc storage segments T2 of racks 51, and by further gripping disc 8 from the top and the bottom using racks 51, it is possible to reduce the tilting of disc 8 at the time of storage. Hereby, since it is possible to reduce the positional misalignment of disc 8 at the position where contact is made with kickers 44, transport faults such as missed hits by kickers 44 can be prevented.

Figure 7:
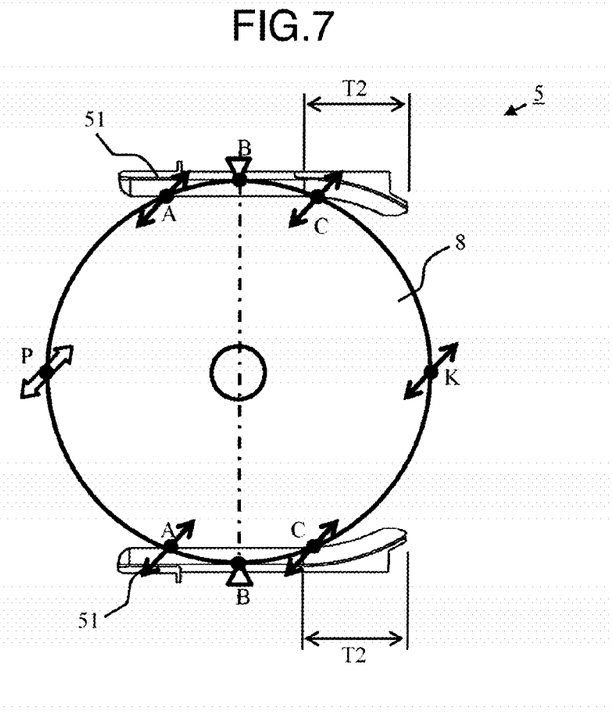
FIG. 7 is an example of a vertical cross section of a cartridge when the disc is moving.

There will be given a description regarding a means of reducing the slippage and tilting of disc 8 at the time of moving disc 8 from cartridge 5 to the disc storage part of robot 4. FIG. 7 is an example of a vertical cross section of cartridge 5 when disc 8 is moving.

If disc 8 starts to move from storage segment T2 of racks 51 due to the pushing out of kickers 44, point C which had point restrained disc 8 is released from the bottom part of the U-shaped guiding groove of rack 51. In this way, it comes about that points C on the periphery of disc 8 there arises slippage within the range of play. Instead of points C, disc 8 in movement touches the bottom part of the U-shaped guiding grooves at points B and is made to approach the center of the guiding grooves. Disc 8 in movement is restrained at two points by the top and bottom pair of points B of racks 51 and is inclined in an out-of-plane direction taking the axis of rotation to be a line joining both points. The inclination of disc 8 is restricted within the range of play permitted by points A and points C, but since point P on the disc periphery has some distance from the axis of rotation, the positional misalignment becomes larger. Because of this, there is a possibility of colliding with structures (frame 48 and picker 45) of robot 4 situated in the traveling direction of disc 8 and bringing about faults.

Figure 8A:
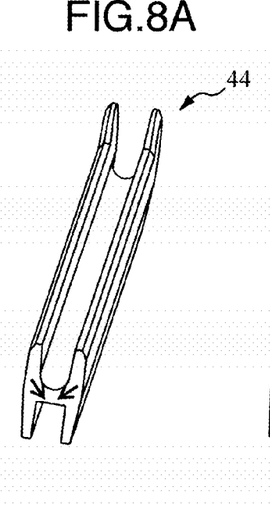
FIGS. 8A and 8B are examples of shapes of kicker guides.
Figure 8B:
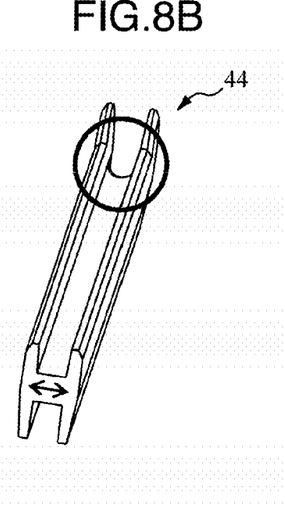

Accordingly, in the present embodiment, there have been formed U shapes in the guides of kickers 44 pushing point K. FIGS. 8A and 8B are examples of shapes of the guides of kickers 44.

As shown in FIG. 8A, the guide of kicker 44 is one formed with a U-shaped groove in the entire groove. As for the groove shape of the guide of kicker 44, it is possible to determine the position of the disc by providing an inclination inside the groove, similarly to the shape inside the groove of a rack 51. Accordingly, it is also acceptable if there is taken a V-shaped groove or a groove with an inclined face.

Also, e.g., as shown in FIG. 8B, it is also acceptable with a guide in which a U-shaped groove is formed only at the tip of the guide of kicker 44. Kicker 44 initially makes contact with point K on the disc periphery at about half the length of the guide and progressively moves the contact position to the tip of the guide as disc 8 is pushed out. Since there is a possibility of colliding with structures of robot 4 when disc 8 has been pushed in to a certain extent, it is possible, in the configuration of the present embodiment, to demonstrate the function sufficiently even with a shape like that of FIG. 8B, if the system is created so that the effect of the groove inclination can be obtained at that point in time.

Figure 9:
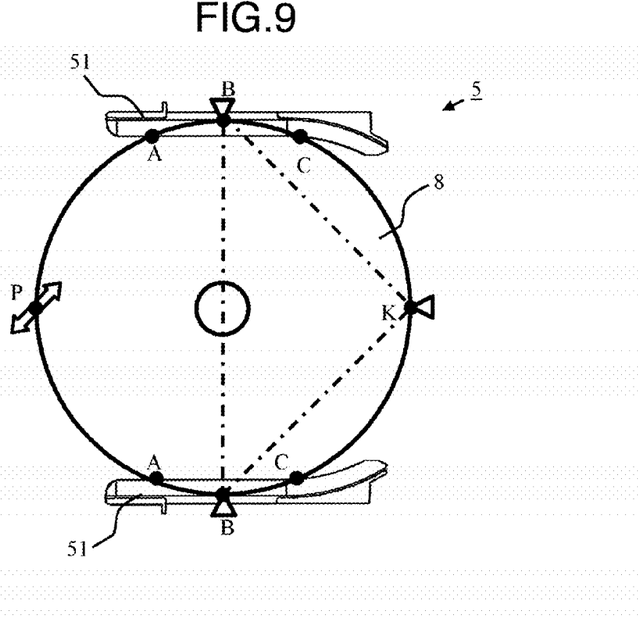
FIG. 9 is an example of a vertical cross section of a cartridge when the disc is moving.

FIG. 9 is an example of a vertical cross section of cartridge 5 during disc movement. As compared with FIG. 7, it shows an example in which a U shape has been chosen for the kicker 44 guide shape, as in FIGS. 8A and 8B. By making the shape of the guide of kicker 44 into a U shape, point K on the periphery of the disc becomes a point restraint. Since a plane surface is uniquely determined by a three-point restraint, the inclination of disc 8 is theoretically zero. Consequently, at point P on the disc storage part side of robot 4, it is possible to make the positional misalignment in the out-of-plane direction extremely small.

In this way, by forming into a U shape not only the shape of the guiding grooves of racks 51 but also the shape of the guides of kickers 44, it is possible to prevent play and tilting of disc 8 during movement. In this way, collisions with structures of robot 4 that are situated in the traveling direction of disc 8 (frame 48 and picker 45) disappear, so transport faults can be prevented.

Figure 10:
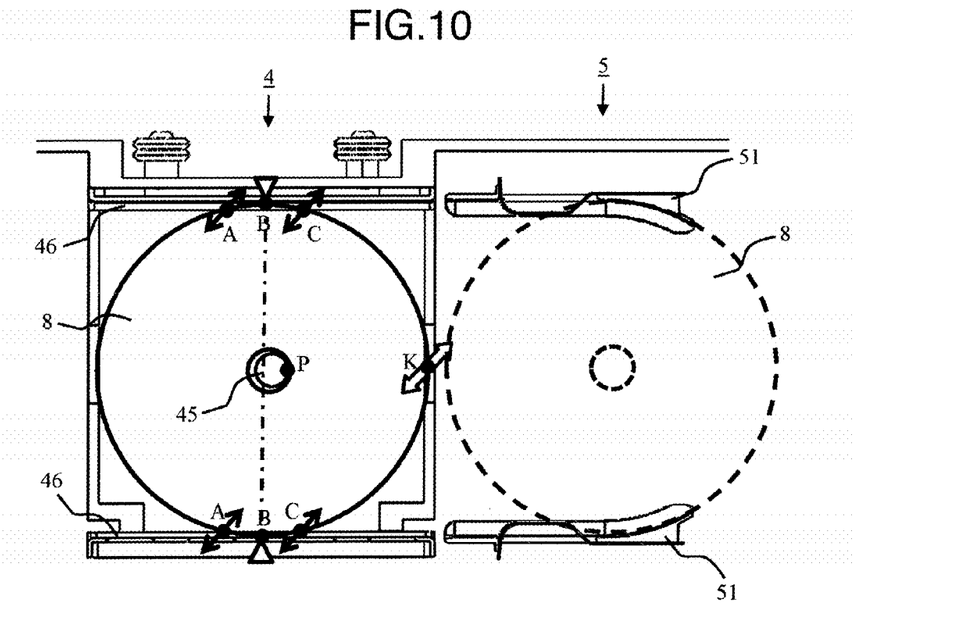
FIG. 10 is an example of a vertical cross section of a robot when the disc is moving.

There will be given a description of a means of reducing the slippage and tilting of disc 8 at the time of moving disc 8 from the disc storage part of robot 4 to cartridge 5. FIG. 10 is an example of a vertical cross section robot 4 at the time of moving the disc.

Disc 8 inside the disc storage part of robot 4 is retained by top and bottom rails 46 and picker 45. At this point, disc 8 is restrained in two places, at points B of top and bottom rails 46, so there is caused tilting having as an axis of rotation a line joining points B. Therefore, the positional misalignment of point K on disc 8 in the out-of-plane direction becomes very large. In a place where disc 8 has moved slightly from the disc storage part of robot 4 to cartridge 5, there is an adjacent disc 8 stored in cartridge 5, so there is a possibility that the same get caught and get scratched due to out-of-plane positional misalignment at point K.

Accordingly, in the present embodiment, there are formed inclined planes having a fixed inclination in rails 46 constituting the disc storage part of robot 4.

Figure 11:
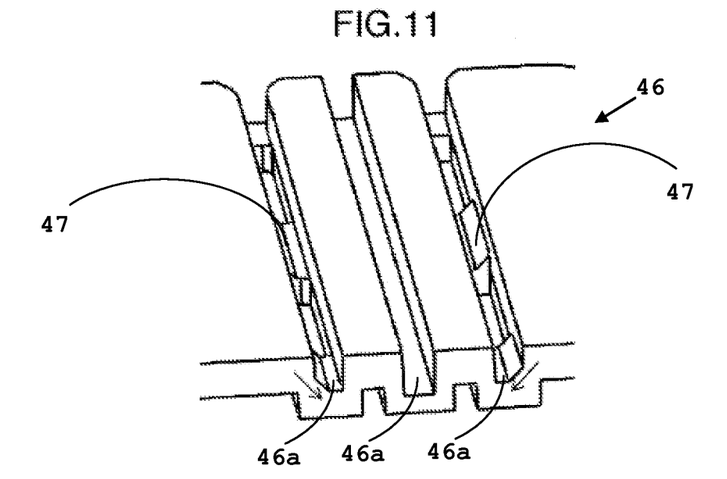
FIG. 11 is an example of the shape of a rail constituting the disc storage part of a robot.

"FIG. 11 is an example of the shape of a rail 46 constituting the disc storage part of robot 4. The guiding grooves 46a of rail 46 are, as shown in the drawing, provided with inclined planes having a fixed inclination. By means of these inclined planes, disc 8 slides in the direction of an arrow and is made to approach one side of the guiding groove 46a. As for disc 8, there is determined a position that is supported by the wall on the face of one side of the guiding groove 46a and the inclined part of the guiding groove 46a. At this time, disc 8 makes contact with the side face walls of the guiding groove 46a of rail 46 in at least two places and is restrained thereby. Also, disc 8 is also point restrained at the point of contact with the inclined plane."

Figure 12:
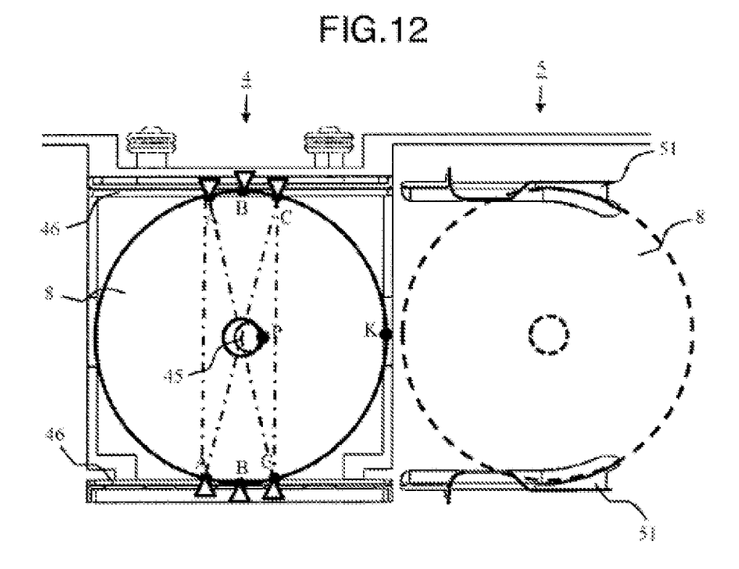
FIG. 12 is an example of a vertical cross section of a robot when the disc is moving.

FIG. 12 is an example of a vertical cross section of robot 4 when the disc is moving. As compared with FIG. 10, there is shown an example in which the shape of the guiding groove of rail 46 is chosen to be an inclined face as shown in FIG. 11. By means of making the shape of the guiding grooves of rail 46 into inclined faces, points A, B, and C on the disc periphery become point restrained. In this way, the result is that disc 8 is point restrained at six points. By means of the six-point restraint, the inclination of disc 8 theoretically becomes zero. Consequently, it is possible to make the positional misalignment in the out-of-plane direction extremely small at point K on the disc.

In this way, by choosing the shape of the guiding groove of rail 46 to be an inclined face, it is possible to prevent play and tilting when disc 8 is moving. Hereby, collisions with adjacent disc 8 disappear, so it is possible to prevent transport faults.

"Further, the present invention is not one limited to the aforementioned embodiment, diverse variations being included therein. The aforementioned embodiment is one example that has been described in detail in order to comprehensibly describe the present invention, but the invention is not necessarily one that is limited to one comprising the entire described configuration. Also, it is possible to replace a part of the configuration of a certain embodiment with the configuration of another embodiment and in addition, it is also possible to add the configuration of another embodiment to a certain embodiment. Moreover, regarding parts of the configuration of each embodiment, it is possible to make additions of other configurations, deletions, and substitutions thereto."

The invention claimed is:

1. An optical disc library apparatus comprising a cartridge storing a plurality of discs each disc having a periphery; a drive carrying out recording and playback with respect to the plurality of discs; and a robot carrying out disc movements between said cartridge and said drive, wherein:
   the robot comprises a first guiding groove;
   the cartridge further comprises a plurality of racks, each rack comprising a guiding groove, the guiding grooves of the plurality of racks further comprising inclined faces sandwiching each of the plurality of discs;
   springs are provided in the guiding grooves of said racks;
   inclined faces are formed in said springs; and
   the periphery of a disc is point restrained in three places by the first guiding groove and two of said guiding grooves of the plurality of racks during disc movement.

2. An optical disc library apparatus comprising a cartridge storing a plurality of discs each disc having a periphery; a drive carrying out recording and playback with respect to the plurality of discs; and a robot carrying out disc movements between said cartridge and said drive, wherein:
   the robot comprises a first guiding groove and a plurality of rails having guiding grooves therein, and inclined faces sandwiching each of the plurality of discs formed in the guiding grooves of the rails;
   springs are provided in the guiding grooves of said rails;
   inclined faces are formed in said springs; and
   the periphery of a disc is point restrained in three places by the first guiding groove and two of said guiding grooves of the rails during disc movement.

3. An optical disc library apparatus, having: a cartridge storing a plurality of discs each disc having a periphery; a drive carrying out recording and playback with respect to the plurality of discs; and a robot carrying out disc movements between said cartridge and said drive; wherein:
   the cartridge comprises a plurality of racks, each rack further comprising a guiding groove;
   the guiding grooves having inclined faces sandwiching the disc formed therein;
   said robot comprises kickers having guiding grooves, the kickers operate to push out one of the plurality of discs to the outside of said cartridge and there are formed inclined planes in the guiding grooves of said robot that make contact with the disc;
   the robot further comprises rails having guiding grooves therein, and inclined faces sandwiching the disc formed in the guiding grooves of the rails; and the periphery of one of the plurality of discs during disc movement is point restrained in three places by the guiding grooves of the rack, the guiding groove of the kicker, and the guiding groove of the rail.

* * * * *